United States Patent [19]

Kuhlman

[11] 3,949,660
[45] Apr. 13, 1976

[54] APPARATUS FOR FORMING SHELLS OF DOUGH

[76] Inventor: Harvey G. Kuhlman, N56 W21466 Silver Spring Road, Menomonee Falls, Wis. 53051

[22] Filed: Jan. 21, 1974

[21] Appl. No.: 435,164

[52] U.S. Cl. .................... 99/352; 99/372; 99/427
[51] Int. Cl.² .......................................... A47J 37/01
[58] Field of Search .................... 99/352, 353–354, 99/372–373, 423, 426–427, 432, 439, 450.3, 450.4, 450.6, 485, 349, 377, 378, 428, 443; 214/309, 1 BB, 1 BS, 1 BT, 1 BV; 425/156–157, 812, 420, 143, 404, 406, 422; 219/243; 83/529; 100/93 P

[56] References Cited
UNITED STATES PATENTS

| | | | |
|---|---|---|---|
| 1,728,064 | 9/1929 | Johnson | 99/439 X |
| 2,823,786 | 2/1958 | Grogg | 214/1 BT X |
| 2,855,867 | 10/1958 | Zeitlin | 99/450.6 |
| 2,907,268 | 10/1959 | Doolin | 99/427 X |
| 3,300,063 | 1/1967 | Jensen et al. | 214/1 BS |
| 3,343,504 | 9/1967 | Beik | 99/450.4 |
| 3,397,655 | 8/1968 | Valadez et al. | 99/427 X |
| 3,469,608 | 9/1969 | Kirchner et al. | 214/1 BB X |
| 3,476,266 | 11/1969 | Devol | 214/1 BB X |
| 3,632,248 | 1/1972 | Reinfeld | 425/157 |
| 3,814,005 | 6/1974 | Widdel | 99/427 X |

Primary Examiner—Stanley N. Gilreath
Assistant Examiner—Arthur O. Henderson
Attorney, Agent, or Firm—Andrus, Sceales, Starke & Sawall

[57] ABSTRACT

A high pressure press including a cup-shaped die member having a relatively narrow, essentially rigidly fixed outer confining lip movable into engagement with a flat bed to define a closed fluid tight cavity for compressing a dough patty into a flat shell. The die and bed are heated to 360°F to bake the dough and generate gases trapped within the cavity. Any of the dough escaping between the lip and bed is compressed to a very thin, film-like connection which becomes brittle on final baking and easily removed. Just prior to raising the die, the holding pressure is eliminated which releases the gases without noticeable adverse effect on the characteristic of the shell. A plate-like vacuum chamber is moved between the die and bed with a bottom perforated plate is superimposed overlying relationship to the shell and dropped down onto the shell to attract the shell for removal from the die. A plurality of piercing pins are provided on the underface of the perforated plate to perforate the top of the shell. To facilitate removal of the shell, an air supply is applied to release the shell for delivery to an oven conveyor. A dough ball transfer unit slides across the bed to place the dough ball under the die.

11 Claims, 10 Drawing Figures

APPARATUS FOR FORMING SHELLS OF DOUGH

BACKGROUND OF THE INVENTION

This invention relates to an apparatus and method of forming of shells from dough and in particular to an apparatus and method of forming pizza shells or other similar flaky crust base members.

In the automated processing of pizzas, pies and the like, various devices and methods have been suggested for forming of the crust or basic supporting shell. The shell for pizzas and the like are preferably of a flaky consistency which is enhanced by employing dough having a relatively low shortening. The dough further requires certain yeasts and the like in accordance with well known food processing. The ingredients result in significant quantities of gas being generated during the baking of the pizza shell. Any automated means must, therefore, give due consideration to the effects of the gas generated in order to produce acceptable and usable pizza shells and the like. For example, it has been suggested to form a pizza shell into a flat plate member by application of a suitable forming press. After it is removed, the shell is perforated. When the shell passes through the oven, the gases generated as a result of the baking are released as the result of the perforations. Although such devices are useful, they have had certain disadvantages on a mass production scale. Thus, in order to provide optimum operation, the quality of the shells formed should be consistently of high quality. This requires that they have not only the essential texture characteristic, but the desired roundness, thickness and the like and be maintainable in a rapid, cylindrical apparatus providing relatively rapid, reliable operation with a minimum cycle time to maintain the desired production.

SUMMARY OF THE PRESENT INVENTION

Generally, in accordance with the present invention an apparatus and method of forming shells includes a high pressure forming die member having a relatively narrow, essentially rigidly fixed outer confining lip. The die member is mounted for movement relative to an opposing die member such as a flat bed, with means for moving the die members into an engaged forming position which defines a closed fluid tight cavity for compressing a dough patty into the configuration of the die cavity. The die closure force is of a very high pressure such as to very rapidly expand the dough outwardly to completely fill the die cavity. Any of the dough product which does escape between the edge of the die lip and the supporting bed is compressed to a very thin, film-like connection. When the unit is removed, the excess material is thus connected to the basic shell portion by a very thin connection. When the formed shell is baked, the very thin section will, of course, be formed into a very brittle like connection which can be readily removed, thereby producing the desired shell on a rapid mass produced basis.

Both of the die members are, in accordance with one aspect of the invention, heated to affect a slight or partial baking of at least the outer surface portions of the shell during the compression pressure forming. As a result of the tight seal between the cooperating die members, of course, any gases generated are trapped within the die cavity. If the shell were rapidly released, there is a danger of the releasing gases effectively rupturing and destroying the formed shell. In accordance with a particularly novel aspect of the present invention, the die pressure is removed or at least significantly reduced. The gases generated within the shell discharge with the forming die members esstentially holding the shell in the desired shape and configuration. Thus, a suitable fluid cylinder means may selectively force the die member into engagement with the die bed. Just prior to opening of the die members, the holding pressure on the cylinder is eliminated momentarily before raising the die member from the bed. The Applicant has found that in this method the gases can be reliably released without any noticeable adverse effect on the characteristic of the shell.

In accordance with a further novel aspect of the present invention, the formed shells are removed through a special vacuum powered pickup means. A plate-like chamber is adapted to be moved into superimposed overlying relationship to the formed, partially baked shell and dropped down over the shell. A vacuum is drawn on the opposing coupling portion of the pickup means to attract the pizza thereto for removal from the die. In accordance with a particularly novel aspect of the present invention, the pickup means is formed with a plurality of piercing means such as pins on its inner coupling portion, such that engagement with the shell directly perforates the shell and in particular insures puncturing of the upper surface thereof. In accordance with a particularly unique feature of the present invention, the chamber includes a lower flat wall having a plurality of distributed openings providing coupling to the upper surface of the partially baked shell. Small pin-like members are provided spaced from each of the vacuum holes such that the maximum lifting force which is applied to the shell also tends to draw such shell into interengagement with the pin members, thereby to assure the perforating of the shell. To facilitate removal of the shell, the pickup unit is alternately connected to an air source which positively drives or releases the shell from the pickup unit and drops it on to the receiving means, for example, which may directly form the part of a final cooking or baking oven.

In a preferred construction of the present invention, one or more of the forming press units are mounted in side by side relationship, with a supporting horizontal bed having a smooth upper surface. The bed is provided with thermostatically controlled heating units to raise the temperature of the bed to a desired cooking temperature which will normally be of the order of 360° F. A forming die is secured to a hydraulically driven piston cylinder and mounted in overlying parallel relationship to the bed. The die unit is also provided with a heater adapted to raise the temperature of the die to a desired cooking temperature which is also preferably of the same order as that of the supporting bed. The die is secured to the piston unit with a relatively flexible universal type connection such that the die unit moves downwardly with the outer confining lip squarely engaging the flat bed. A dough transfer means is provided to an infeed side of the die units and preferably includes a reciprocating push member adapted to slide across the upper supporting surface of the bed. A conveyor means provides for automatic transfer of dough balls into the sliding transfer means which are operated in proper timed relation to locate the dough ball generally centrally of the high pressure die member. Where plurality of the assemblies are mounted in side by side relation, at least a pair of pickup chambers are supported on the outer ends of a common tube support which is selectively connected to vacuum and to a positive air supply. The tube support is carried by a pickup position such as piston-cyclinder unit located between the laterally spaced forming die units. The piston-cyclinder unit is pivotally mounted to extend and retract the pickup chambers with respect to the die units and with respect to the receiver such as oven feed conveyor. The pivotally mounted unit is vertically positioned between a raised transfer position and a lowered shell pickup position by a suitable cyclinder unit or the like. The total system operates in proper sequence and may be constructed with the several cyclinder units having integrally actuated control switch means for providing the operation of the several components.

The present invention is particularly directed to the rapid mass production of dough shells such as for pizzas and the like. The total apparatus is relatively simple and is readily provided with interrelated controls to permit the desired controlled timed operation of the several elements and cooperating parts. Further, the apparatus is readily adapted to the formation of different sized shells by merely replacing of the forming dies.

DESCRIPTION OF THE DRAWINGS

The drawings furnished herewith illustrate the best mode presently contemplated for carrying out the invention and described hereinafter.

In the drawings.

DESCRIPTION OF ILLUSTRATED EMBODIMENT

Figure 1:
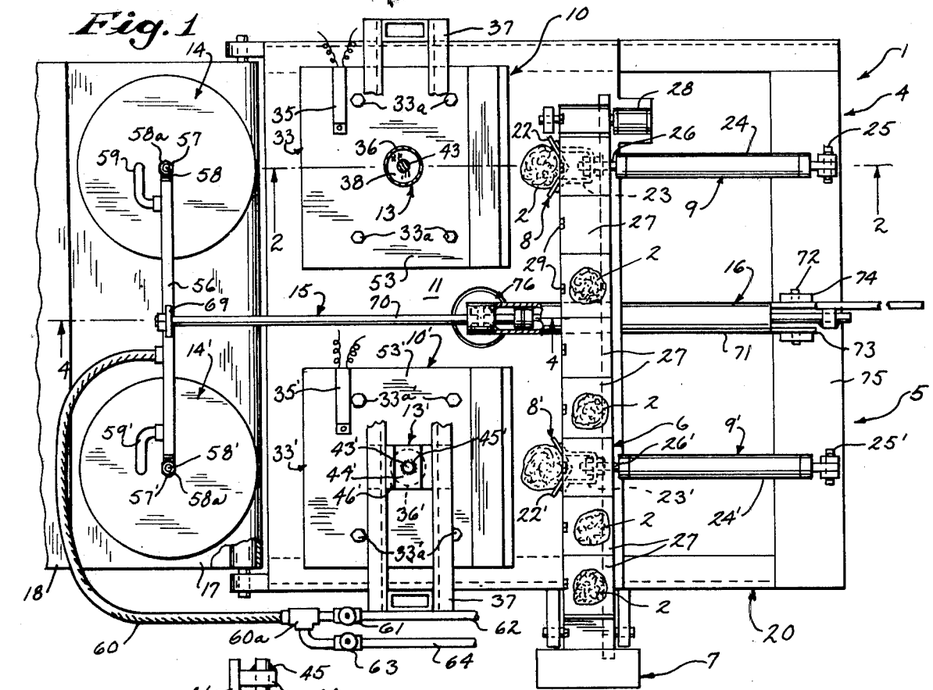
FIG. 1 is a top plan view of an apparatus including a pair of side-by-side pizza shells forming press units, particularly constructed in accordance with the present invention.
Figures 2, 7, 8:
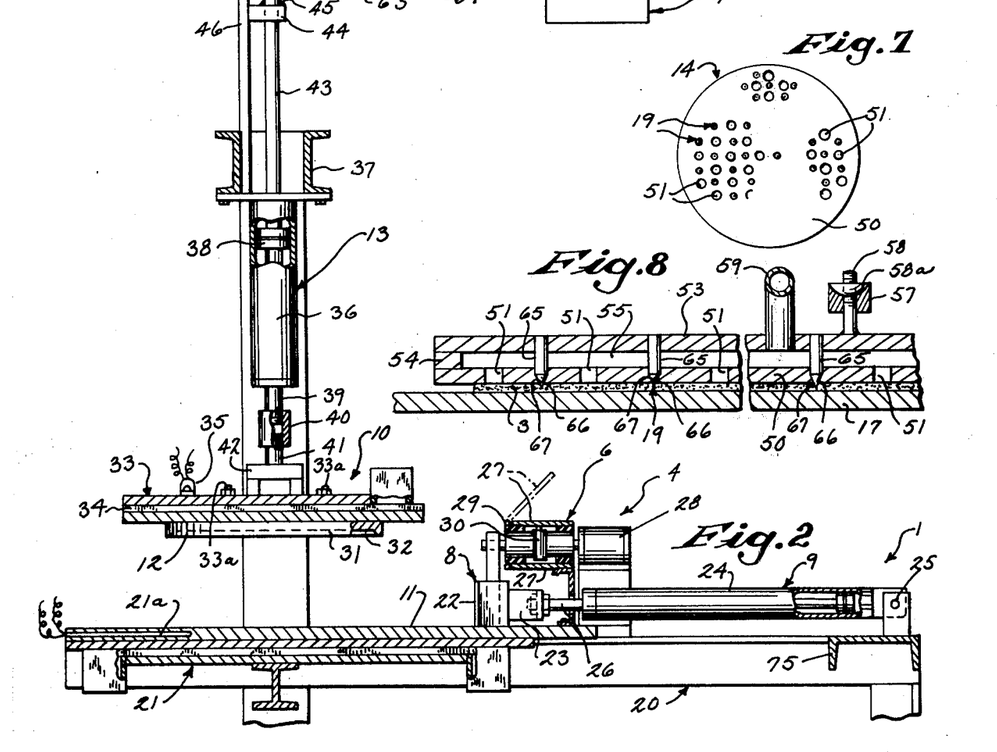
FIG. 2 is a fragmentary side elevational view taken generally on line 2—2 of FIG. 1 and generally illustrating the transfer mechanism for initially locating dough balls within the shell forming press units.
FIG. 7 is an enlarged bottom view of a shell pickup chamber shown in FIGS. 1–5.
FIG. 8 is an enlarged fragmentary cross vertical section through the pickup chamber and more clearly illustrating a novel shell piercing means.
Figures 3, 4, 5, 6:
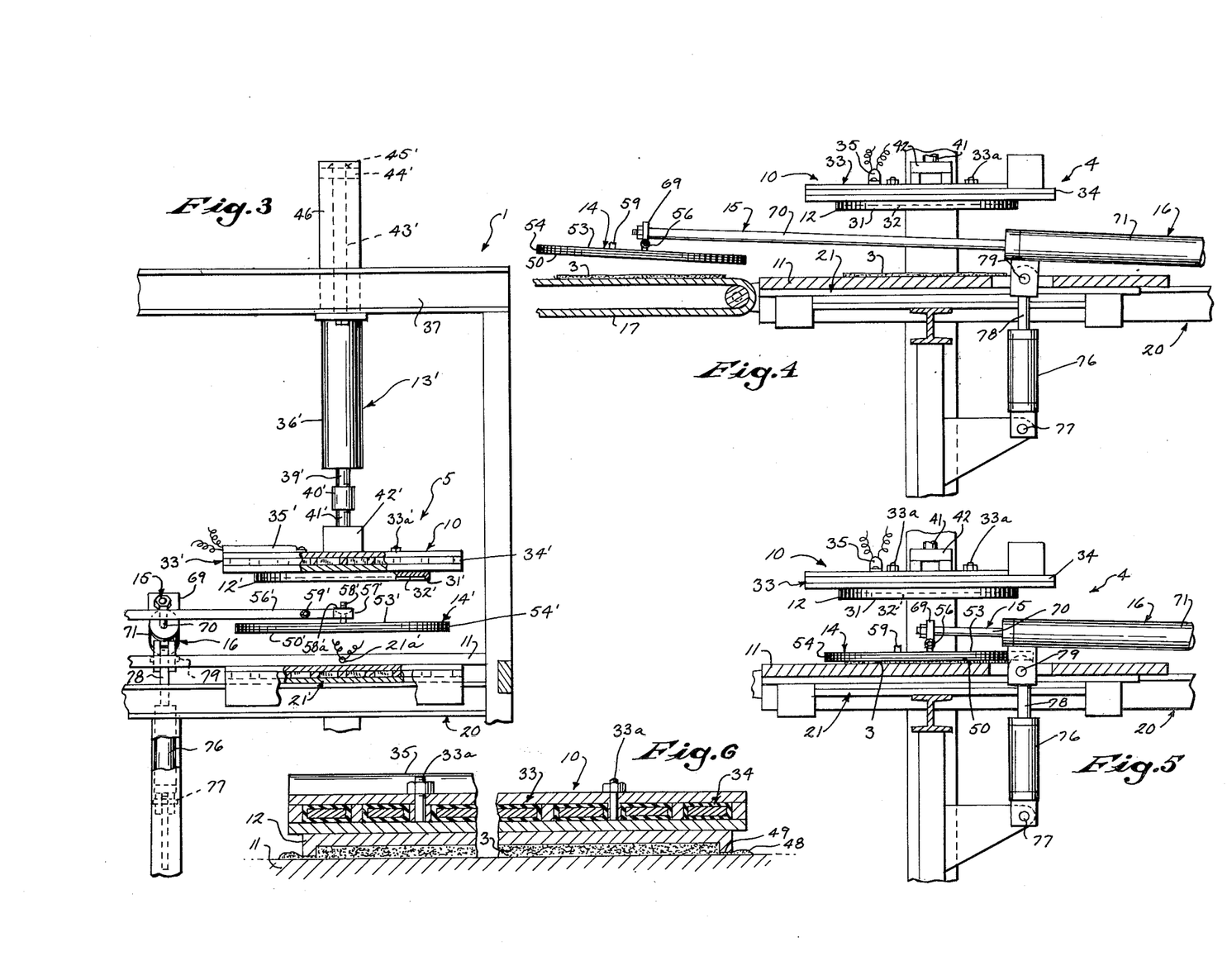
FIG. 3 is a front elevational view of one of the press units shown in FIG. 1.
FIG. 4 is a fragmentary sectional view taken generally on line 4—4 of FIG. 1 and more clearly illustrating the formed shell transfer mechanism.
FIG. 5 is a fragmentary view similar to FIG. 4 showing the pickup apparatus in the shell pickup position.
FIG. 6 is an enlarged vertical section through the die unit shown in FIGS. 1–5.

Referring to the drawings and particularly to FIGS. 1–3, the present invention is shown applied to a shell forming apparatus 1 for converting of dough balls or patties 2 into flat, plate-like pizza shells 3. In the illustrated embodiment of the apparatus a pair of individual shell forming units 4 and 5 are located in side-by-side relationship and interconnected for common infeed and removal of simultaneously formed shells 3. Although described with a pair of forming units 4 and 5, the apparatus can obviously be constructed with a single station or any number of additional stations where desired, depending upon the space and production requirements. The forming units 4 and 5 are simultaneously supplied with dough balls 3 from a common infeed conveyor 6, extending across the infeed side thereof. The conveyor 6 receives the individual dough balls in proper spaced relation from a suitable bulk source 7 and through proper timed operation delivers the dough balls 2 into the several forming units 4 and 5.

The forming unit 4 is particularly described in detail with the corresponding elements of the unit 5 identified by corresponding primed numbers where description is necessary.

The unit 4 in particular includes a transfer unit 8 which is coupled to a reciprocating power positioner 9 for selective transfer of an aligned dough ball 2 into a die or press unit 10 of the forming unit 4. After proper locating of the dough ball 2, the transfer unit 8 retracts, leaving the dough ball 2 in a proper location within the press unit 10. Generally, the press unit 10 includes a flat heated supporting bed 11 with the dough ball 2 deposited thereon in alignment with a vertically reciprocating specially constructed heated forming die 12. Thus, the forming die is interconnected as hereinafter described to a power positioner 13 shown as a piston-cyclinder unit. In accordance with the present invention, the die 12 is rapidly lowered under a relatively high pressure to compress the dough ball 2 within the die cavity to form a flat pizza shell, after which die pressure is momentarily released before raising of the die 12 to form a partially baked shell resting on the flat bed in the press unit. In accordance with the illustrated embodiment of the invention, a novel vacuum pickup device 14 is carried by a common support 15. A power positioner 16 is connected to selectively position the pickup device 14 in an extended position spaced from the press unit 10 and in overlying relationship to a conveyor 17 forming a part of a final shell baking oven 18 or any other subsequent processing apparatus. Alternately, positioner 16 retracts and locates the pickup device 14 overlying a shell 3. A suitable vacuum source is applied to the pickup device which attracts the shell from the flat bed 11 for transfer onto the conveyor 17 by release of the vacuum and, if desired, application of a positive release pressure. In accordance with the present teaching, the pickup device 14 includes special piercing elements 19 to perforate the top of the shell 3 within the press unit 10. Conveyor 6, as well as the several power positioners for transfer unit 8, die 12 and vacuum pickup device 14, cyclically operate to successively form the incoming dough balls into partially baked and perforated shells 3 and delivers them into the baking oven 18.

More particularly in the illustrated embodiment of the invention, the flat bed 11 has a smooth top supporting surface which is readily adapted to receive the pizza dough with compression thereof, onto the bed without sticking. As hereinafter noted, the dough ball 2 may be provided with a cooking oil or, if desired, the bed 11 is mounted within a supporting framework 20 of the forming unit 4 and 5 and located in an essentially horizontal plane. A platelike heating unit 21 is clamped in abutting relation to the underside of bed 11 to heat thereof. A thermostat 21a is embedded within the bed 11 to provide a thermostatic control of the heating unit 21 to thereby permit very accurate control of the temperature of the bed surface. Although the temperature level is not critical, Applicant has found that the bed should be maintained at a surface temperature of the order or range of 325 to 425° F (fahrenheit) and preferably of the order of 360° F to properly process the shells in a mass production process as more fully developed hereinafter. For forming of conventional dough shells 3 employed in present day pizzas, a 6,000 Watt heating unit has provided an adequate heat source which can be accurately thermostatically controlled.

The smooth surfaced bed 11 extends toward and beneath the transfer unit 8 as most clearly illustrated in FIG. 2 or 3; to receive the dough ball 2 preparatory to movement into the press unit 10. The illustrated transfer unit 8 includes a generally curved or V-shaped scraper 22 opening toward the press unit 10. The scraper 22 is secured to a supporting bracket 23 for sliding movement across the bed 11 under the action of the transfer power positioner 9. Thus in the illustrated embodiment of the invention, the positioner 9 is a hydraulic cylinder unit having a cylinder 24 pivotally interconnected to the supporting framework 19 generally in alignment with the center of the press unit 10, as at 25. The piston rod 26 projects forwardly of the cylinder and is secured to the supporting bracket 23. The scraper 22 rests on the supporting bed 11 and supports the outer end of the piston rod 26 and the pivotally mounted cylinder 24. The scraper 22 is formed of trademarked material Teflon or other suitable low friction material such that it can slide across the top surface of the bed 11 without damaging the bed. Thus when a dough ball 2 is dropped in front of the scraper 22 and the scraper is moved forwardly, the V-shape will tend to center the dough ball for alignment within the press unit 10.

The forward projection of the piston rod 26, of course, propels the dough ball inwardly beneath the die 12 and by controlling the extension of the piston rod, the location of the dough ball is accurately controlled to permit centering with the center of the press unit and generally with the center of the die 12.

The dough balls 2 are properly delivered to the scraper 22 by the conveyor unit 6 which in the illustrated embodiment of the invention is shown as an endless series of trays 27 mounted as a carousel type conveyor unit which is driven by a suitable stepper motor 28 to successively align the trays with the forming units 4 and 5. The conveyor 6 steps two trays 27 for each desired transfer to accommodate the removal of the dough ball 2 from the leading transfer forming unit 5. In the illustrated embodiment of the invention, each of the trays 27 is shown as a small pivotally mounted unit connected to the structure by a small pivot mounting 29 with their outer ends resting on the conveyor mechanism. A small tip-up unit 30 such as a pneumatic cylinder unit is provided in each alignment with the scraper 22 which is activated to transfer a new dough ball into alignment with the V-shaped scraper to thereby properly locate it in alignment with and for transfer into the forming press unit 10, where the downward movement of the forming die 12 converts it into the desired shaped pizza shell 3.

As more clearly shown in FIGS. 2, 3 and 6, the forming die 12 in the illustrated embodiment of the invention is a relatively heavy plate-like element having a depending lip 31 extending downwardly from a relatively flat base portion or flat base 32 to define a small cavity essentially corresponding to the diameter and depth of the desired pizza shell 3. The lip 31 may be provided with a slight inner relief or inclined wall to facilitate removal of the shell from the die 12 as it moves upwardly. The die 12 is secured in abutting relation to a heat source or plate 33 as by a plurality of stud members 33a which project upwardly through the heat plate and receive clamping nuts secured to the outer end thereof. The heating plate 33 includes an internal heater 34. A thermostat 35 is secured to the backside of the heater to control the energization of the heater 34. Applicant has found that it is desirable to maintain the die unit or the die 12 at a relatively high temperature and generally of the same order as that of the bed 11. Thus in a practical application, Applicant has found that maintaining of inner flat base surface 32 at 360° F produces highly satisfactory and desirable results although such given temperatures should not be considered a limitation on the possible broad teaching of the other novel aspects of the present invention.

The heating plate 33 and interconnecting die 12 are selectively positioned by the power positioner 13 which as previously noted is also a hydraulic cylinder power unit, as most clearly shown in FIG. 2. Thus a hydraulic cylinder 36 is mounted in fixed relation to an encircling frame member 37 of the framework 19. A double-ended piston 38 is mounted within the hydraulic cylinder 36 and has a depending piston rod 39 the outermost end of which is threaded. A threaded coupler 40 adjustably connects the piston rod 39 to a stud 41 secured to the backside of the heating plate 33 by a suitable universal bracket 42. Thus the bracket 42 may be provided with a flexible upper wall such that the downward force applied to the die 12 through the heating plate provides for firm interengagement of the complete encircling die lip 31 on the flat bed 11 to create an essentially fluid tight joint for reasons more fully hereinafter developed.

The oppositely projecting piston rod 43 projects upwardly with a sliding guide block 44 rigidly affixed as by a weld 45 or other interconnecting means to the outermost end of the rod 43. The sliding block 44 has a flat face slidably abutting a stop plate or strip 46 secured to and projecting vertically upwardly from the top frame member 37. The sliding engagement of block 44 and plate 46 prevents angular movement of the heating plate 33 and the interconnected die 12 to maintain the desired precise interrelationship of the unit, particularly the rectangular heating plate.

The hydraulic cylinder 36 of the die positioner 13 is connected to a suitable high pressure hydraulic power supply in order to establish a relatively high pressure engagement between the die lip 31 and the top of the bed 11. Thus under a practical application the die 12 is forced into engagement with a sealing pressure in the order of 1,000 to 5,000 psi. In a practical construction, various size pizza shells are formed by connection of appropriate diameter dies in the die unit. Generally, the depth of the cavity is constant. The width of the lip 31 is also generally the same or similar such that the unit per sealing pressure varies with the diameter of the die. The top width may, for example, be approximately one hundred twenty-thousandths of an inch. Employing a power cylinder of 2½ inch diameter and a supply pressure of 500 to 1,000 psi will create a sealing pressure slightly in excess of 900 to 1,800 psi on a 14 inch shell die and 1,500 to 3,000 psi on a 7 inch shell die 12. The high pressure effectively seals the cavity to trap gases generated by the baking of the dough 2 within the cavity. This is desirable to effectively work the dough 2 within the cavity and form a broken, flaky type crust or shell 3. The actual pressure will be reduced by the reaction pressure of the dough 2 within the cavity and the generated gases. The recited pressures have been found to maintain the confining of the generated gases. As the die 12 moves downwardly, the dough rapidly moves outwardly within the confines of the depending lip 31, almost with an impact type movement. Although a slight amount of the dough ball 2 may actually extrude outwardly between the lip 31, as shown in FIG. 6. The high pressure results in an extreme thinning of the material between the lip 31 and bed 11. The shell 3 is, therefore, confined within the depending lip 31 with the excess material 48 on the exterior of the lip 31 and connected to the shell proper by the very thin film-like connecting portion 49.

As the shell passes through the baking oven 18 the thin film portion 49 is thoroughly baked into a relatively brittle connecting portion which will essentially break away from the shell to provide a very highly desired accurately controlled circular shell as defined by the configuration of the depending lip 31.

After the proper positioning of the dough ball 2, in a practical application, die 12 is moved downwardly into the forming and clamping engagement where it is held from 1 to 3 seconds. During this period of time the shell 3 is formed and the outer surfaces thereof partially baked. During the baking period the gases will be evolved within the die cavity defined by the engaged die members. If the die is rapidly removed, the releasing gas would tend to disrupt and destroy the character of the shell 3. In accordance with an important and novel aspect of the present invention, the die 12 is maintained in the holding position, but the fluid pressure on the cylinder 36 is removed, or at least significantly reduced for a very short period, for example, on the order of ½ second, after which the die 12 is first moved upwardly in a spaced relation to the formed shell 3. Applicant has found that this permits release of the generated gases while maintaining the shell configuration. Once the die 12 has been moved upwardly, the vacuum pickup unit 14 is positioned or moved into the press unit 4 to pick up the properly formed shell 3 for transfer to the baking oven 18.

In the illustrated embodiment of the invention, the vacuum pickup units 14 and 14' are connected to the common support 15 for simultaneous movement into and from the forming units 4 and 5.

As more clearly shown in FIGS. 7 and 8, the vacuum pickup unit 14 particularly includes a pickup plate 50 which is provided with a significant number of perforations 51 shown as a plurality of aligned rows of perforations. The pickup plate 50 is significantly or somewhat larger than the final formed shell 3. The pickup plate 50 is secured to the underside of a top support plate 53 with a suitable encircling spacer 54 to define a common chamber 55 communicating with all of the perforations 51. Thus creation of a pressure or vacuum in chamber 55 provides a corresponding pressure transfer to the several perforations. The pressure condition within the chamber 55 is controlled as follows.

The support plate 53 is secured to one end of a common cross tube 56 forming a part of the common support 15 for the pickup units 14 and 14'. The outer end of the cross tube 56 is closed and connected by a universal connection to the support plate 53 to permit swivel movement of the pickup unit 14 and particularly the inter connected plate 50 such that it moves downwardly and rests directly thereon. The universal connection in the illustrated embodiment of the invention is shown in simplified form including a socket member 57 secured to the other end of the cross tube 56 with a supporting bolt 58 passing through the socket 57. A clamping nut 58a has a curved undersurface mating with the socket and thereby provides a universal type movement.

The common tube 56 forms a part of the fluid supply system and is connected by a coupling tube or line 59 through an opening in the support plate 53 to the chamber 55. A fluid supply line 60 is connected to the center portion of the cross tube 56 for supplying vacuum and air to the chamber 55. Thus, the fluid line 60 is connected through a T-connector 60a to a vacuum valve 61 having its inlet connected to a vacuum line 62. The T-connector 60a also connects the fluid line 60 to an air valve 63 which is connected to an air supply line 64. The valves 61 and 63 are alternately positioned to selectively create a vacuum in chamber 55 to permit pickup of a shell 3 with the pickup plate resting on a shell 3. The vacuum valve 51 is closed and the air valve 63 is opened when the pickup units 14 and 14' are moved outwardly to the extended position overlying the oven conveyor 17 as shown in FIG. 1 and 3 to facilitate the dropping of the shell downwardly onto the conveying unit for passage through the oven 18.

In accordance with an important aspect of the present invention, the pickup units 14 and 14' are especially constructed to perforate the shell 3 within the press unit 10 as follows. Referring particularly to FIG. 8, piercing elements 19 are secured to the bottom portion of the vacuum pickup units in offset relation with the several perforations 51 of the pickup plate 50. In the illustrated embodiment of the invention, the piercing elements 19 are shown as small pin-like elements with a shank portion 65 held in plate 53 and extending downwardly through corresponding openings in plate 50 with the sharp pointed end 66 extending outwardly beyond the bottom plane of the pickup plate 50. The pin points 66 may, of course, be otherwise formed on plate 50. When a vacuum is applied to the chamber 55 and the pickup plate 50 is resting on the shell 3 the aligned partially cooked shell is pulled inwardly into firm engagement with the plate 50.

As the pickup unit 14 drops downwardly over a formed shell, the plate or the bottom surface of the plate essentially rests on the top surface of the shell.

As shown in FIGS. 2-4, the illustrated common support 15 for selectively positioning of the pickup units 14 includes a common mounting bracket 69 secured to the center portion of the tube 56 for interconnection of the pickup positioner 16, which is also shown as a hydraulic cylinder unit. In particular, the piston rod 70 is secured to the mounting bracket 69 and is slidably controlled by a piston, not shown, within a cylinder 71.

The piston rod and cylinder are located generally, centrally between the forming units 4 and 5 with the cross tube 56 providing for proper spacing of the pickup units 14 in alignment with the forming units 4 and 5. The back end of the cylinder 71 is pivotally mounted as by a pivot pin 72 passing through a cylinder clevis 73 and a bracket 74 secured on a frame cross brace 75. The raising and lowering of the pickup unit 14 is controlled by an up-down hydraulic cylinder unit 76 secured beneath the forward end of the cylinder 71. The cylinder unit 76 has its cylinder pivotally mounted to the framework as at 77 with an upwardly projecting piston rod 78 pivotally connected to the forward end of the cylinder 71 as at 79. The piston rod 78 is retracted to lower the pickup unit 14 into engagement with a shell 3 within the press unit 10 and is extended to raise the pickup unit 14 and carry the formed shell 3 outwardly into overlying relationship to the conveyor 17. The hydraulic force of the cylinder unit 76 pulls the plate 50 downwardly onto shell 3 clamping it against bed 11 and providing a forced movement of the sharp piercing ends 66 of the pins 19 to thereby generate a slight hole 79 within the top surface of the shell 3, as shown in FIG. 8. Applicant has found that this provides a very reliable and simple means of forming the shell holes within the press unit 10 and then transferring of the properly formed shell from the unit 10 and thereafter to the oven conveyor 17.

The hydraulic cylinder positioner 16 and hydraulic cylinder unit 76 are operated in proper timed relation to provide the desired extension retraction and raising and lowering of the pickup unit in proper timed relationship to the operation of the die 12. Similarly, the movement of die 12 is related to the movement of the transfer unit 8 and the conveyor 6. Although any desired interrelated controls can be provided a particularly satisfactory system is shown in FIGS. 9 and 10 for purposes of clearly and fully describing one embodiment of the present invention.

Figure 9:
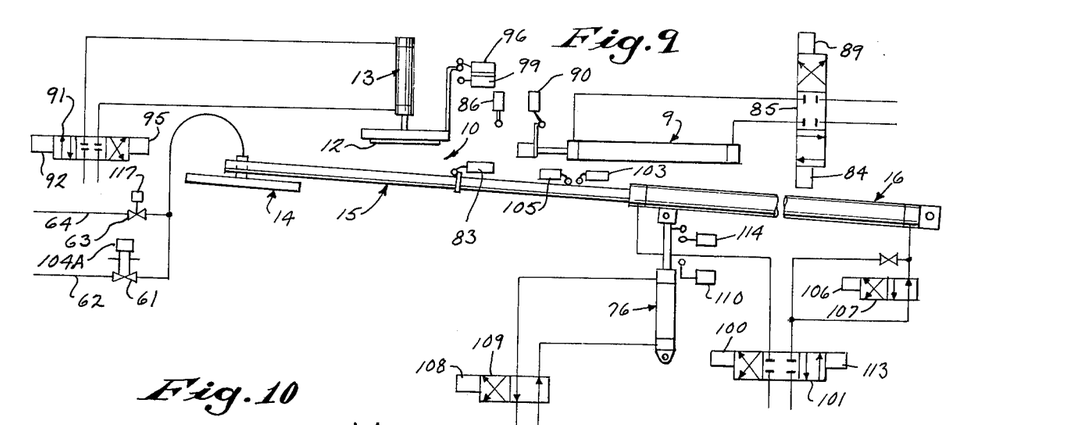
FIG. 9 is a diagrammatic illustration of the forming and removal apparatus with interrelated drive and switching controls.
Figure 10:
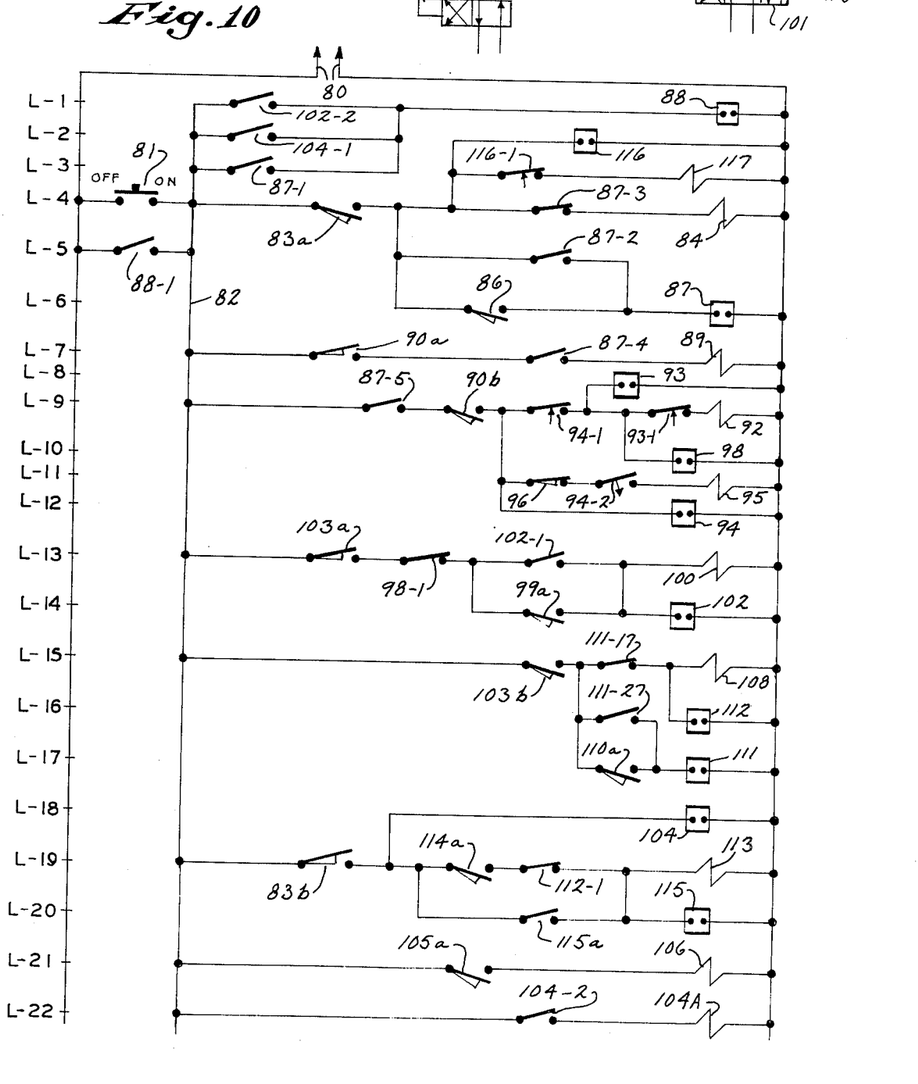
FIG. 10 is a schematic circuit diagram showing the interconnecting of switches, relays and control windings or coils of FIG. 9.

Referring particularly to FIG. 9, the transfer unit 8, the die 12 and the pickup device 14 are shown diagrammatically and are correspondingly numbered in accordance with the numbering heretofore employed in connection with the preferred illustrated embodiment. The several switches are diagrammatically illustrated including the actuating controls which are coupled to the several devices for purposes of illustration. The hydraulic flow control valves are also diagrammatically shown through conventional accepted symbols. The operation of the system in the interrelated circuits and switches is particularly described in connection with the circuit diagram of FIG. 10.

The circuit diagram is particularly illustrated as an across-the-line type diagram with the main power line 80 shown as a pair of spaced parallel lines with the cross lines identified by numbers L-1 through L-22, inclusive, for reference purposes. The one power line 80 is connected directly to one side of all of the cross lines, while the second side of the power lines is connected thereto through an on-off control switch 81 in line L-4 to selectively supplied power to an intermediate common line 82. The on-off switch 81 provides for initial turning on of the apparatus and the switch must be held closed for a period to permit latching of the circuit into operation as hereinafter described.

Thus, it is assumed that the apparatus is in the position of FIG. 9 where it is in an initial starting position to introduce a dough ball 2 into the unit 10. In this position, a limit switch 83 is held closed by the extended piston unit 16 of the pickup unit 14. The switch 83 includes a first contact 83a shown in aligned L-4 for supplying power to a solenoid 84 of a solenoid valve 85. As shown in FIG. 9 the solenoid valve 85 controls the flow of liquid to the transfer unit positioner 9 to extend the positioner in order to move the doughball into the press unit 10.

A limit switch 86 controlled by the transfer unit 9 includes a set of normally open contacts 86a connected in L-6 and supplying power to a series interlock relay 87. The relay 87 includes a first set of normally open interlocking contacts 86-1 in line L-3 providing power from line 82 through an interlock relay 88 at line L-1. Relay 88, in turn, has normally open interlock contacts 88-1 connected in parallel with the on-off switch 81 so it will complete a cycle if switch 81 is turned off after extension of the transfer unit 9.

Relay 87 includes a set of normally open latch contacts 87-2 in line L-5. Relay 87 has a set of normally closed contacts 87-3 in series circuit for the extending solenoid 85 in line L-4. Simultaneously, a fourth set of normally open contacts 87-4 in line L-7 to provide for energization of the opposite side of the solenoid valve 85 and in particular a solenoid 89 which reverses and retracts the unit 9 at which time a limit switch 90 is actuated. A first set of contacts 90a in the line L-7 terminate energization of the retract solenoid 89, returning of the solenoid valve 85 to the central locking position. Normally open limit switch contacts 90b in line L-9 now provide power through a set of normally closed contacts 87-5 of the interlock relay 87 to activate a solenoid valve 91 for the die power positioner 13 as follows. The solenoid valve 91 has a first solenoid 92 connected in line L-8 which is energized upon the described closing of the limit switch 90 to lower the die unit into the forming position. Simultaneously, with the energization of the solenoid 92, a first timing relay 93 in line L-8 and a second timing relay 94 in line L-12 are energized to provide for the previously described sequeential movement of the die 12. In particular, the timing relay 93 in line L-8 has a first set of normally closed contacts 93-1 in series with the solenoid 92 of valve 91. After a predetermined cooking or forming period, the relay contacts 93-1 open thereby removing the power from the solenoid 92 and permitting the valve to return to the standby position. This permits the cooking generated gases trapped within the cavity to release while maintaining the forming die 12 about the partially cooked shell 3. During this timing period the timing relay 94 line L-12 is still timing out to control a first set of normally closed 94-1 contacts in the die solenoid drop circuit of line L-9 and a second set of normally open contacts 94-2 in line L-11 for energizing a raise solenoid 95 of the die positioner valve 91. After the second timing period, sufficient to allow the escape of the gas from the shell 3, for example on the order of one-half second, the raise solenoid 95 is energized to rapidly retract the die 12. The upward movement, actuates a limit switch 96 upon complete retraction, which has contacts 96a in line L-11 to open the circuit to solenoid 95. The die solenoid and timing circuit further includes an interlock relay 98 in line L-9 having contacts 98-1 in line L-13 providing an interlock to the retract circuit for the pickup unit 14. Thus, upon upward movement of the die unit 12, a limit switch 99 is momentarily operated to close a set of contacts 99a in line L-14 and provide power to a retract solenoid 100 of a solenoid valve 101 supplying power to unit 16. An interlock relay 102 in line L-14 has contacts 102-1 in line L-13 to by-pass limit switch 99a and permit response to the momentary operation. Relay 102 further has interlock contacts 102-2 in line L-1 to maintain continued operation. The circuit for solenoid 100 is finally controlled by a limit switch 103 having normally closed contacts 103a in line L-13. Limit switch 103 is controlled by full retraction of the pickup unit 14, so the positioner 16 now retracts.

The initial movement, releases limit switch 83 to open contacts 83a in line L-4 and close a second set of contacts 83b in line L-19 to energize an interlock relay 104 having interlock contacts 104-1 in line L-2 and normally open contacts 104-2 in line L-22 to control the vacuum valve solenoid 104A in line L-22. This opens the valve 61 in vacuum line 62 to the pickup unit 14.

During the retraction of pickup unit 14, a limit switch 105 is momentarily actuated. Switch 105 has contacts 105a in line L-21 controlling a solenoid 106 of a buffer valve 107 in the hydraulic circuit of the pickup unit. In practice, all the hydraulic motor units would preferably be provided with internal buffing means and valve 107 is shown for purposes of explanation only.

At the end of retraction, limit switch 103 is activated to open the contacts 103a in line L-13 and to close a set of contacts 103b in line L-15 to activate a solenoid 106 of a valve 109 controlling the power positioner 76, which lowers the pickup unit 14 to the position of FIG. 5. At the bottom end, a limit switch 110 is actuated and closes a set of contacts 110 in line L-17 to energize a relay 111 which opens a set of contacts 111-1 in line L-15 to terminate operation of unit 76 and closes a set of interlock contacts 111-2 in line L-16.

A further sequence relay 112 in line L-16 is paralleled with solenoid 108 and when die energized at the end of the lower cycle, relay 112 drops to close a set of normally closed contacts 112-1 in line L-19 for conditioning of extension of pickup unit 14 by energizing of a solenoid 113 of valve 101 for positioner 16.

As the pickup unit 14 is raised, the power unit 76 momentarily actuates a limit switch 114 just prior to its final raising movement. Switch 114 has contacts 114a in line L-19 which closes to energize the pickup extending solenoid 113. An interlock relay 115 in line L-20 is simultaneously energized and closes a set of interlock contacts 115a in line L-20 to effect extension of pickup unit 14.

At the final extension as shown in full, limit switch 103 is again activated. This opens contacts 83b in line 19 to de-energize the circuit of extending solenoid 113 and also drop interlock relay 104 which opens contacts 104-2 in line L-19 to remove the vacuum from device 14.

Simultaneously, contacts 83a close to initiate a new cycle and also energize a timing relay 116 in line L-2. Relay 116 closes contacts 116-1 in line L-3 to energize a solenoid 117 of the air valve 63 to open the air line 64 and positively drop the shell 3 onto the oven conveyor 17, as the forming unit initiates the new cycle.

The system will continuously cycle until switch 81 is opened, at which time it will complete the cycle, with relay 89 dropping contacts 88-1 at the terminal end of that final cycle by dropping of contacts 104-1.

The present invention provides a means for positively pressure forming and partial baking of the shells in a rapid and efficient manner with the high pressure forming and venting producing high quality dough texture and shape and, with the pickup means providing for perforating and subsequent transfer from the press unit.

Various modes of carrying out the invention are contemplated as being within the scope of the following claims, particularly pointing out and distinctly claiming the subject matter which is regarded as the invention.

I claim:

1. A food dough forming apparatus comprising a pair of die members, one of said die members including a lip and the other having a flat surface defining a forming cavity, controlled heating means associated with both of said die members for raising the temperature of both die members with the lip and with the flat surface to heat and bake the dough within the cavity, means to hold the die members in a closed position with an essentially fluid tight cavity, said baking generating gases within the die members of sufficient magnitude to disrupt the dough upon release, means to substantially reduce the holding force of said holding means without permitting significant separation of the die members to release said gases while confining of the baked dough within said cavity, means to separate said die members and permit removal of the baked dough from the cavity, reciprocating fluid positioning means for establishing a confining lip pressure generally in excess of 1,000 psi on said lip in the closed forming position, die positioning means including means to release said confining lip pressure for a selected period before raising of said die member from said supporting surface, a vacuum operated pickup means movable into overlying covering relationship to said shell with an opposing vacuum chamber coupled to said shell, said pickup means having a plurality of piercing means for piercing at least the surface of said shell, a transfer position means to place dough within the die and including a control means coupled to actuate said transfer positioning means, said die positioning means and said pickup means and having response means responsive to the actuation of each of said positioning means to control the cyclical actuation of said positioning means.

2. The food dough forming apparatus of claim 1 wherein said several positioning means are pneumatic piston-cyclinder units having piston rod elements and said response means include limit switches responsive to the extension and retraction of said piston rod elements.

3. A food dough forming apparatus for pressing a dough patty into a generally flat shell, comprising a pair of cooperating die members defining a cavity essentially corresponding to said flat shell and having said sidewalls essentially rigid in the closed position, means for introducing a dough patty between said die members, means for closing said die members to rapidly expand said patty to fill said cavity and to compress any dough between said sidewall to a film-like thickness, shell removing means including a pickup unit movably mounted in overlying relationship to said shell, said pickup unit having means to create a vacuum at the overlying portion to firmly draw the shell to the pickup unit for removal from the die members, said pickup unit including a plurality of shell piercing members located in said overlying portion, said vacuum establishing a force on said shell to force the shell into said piercing members perforating said shell and for transfer of said shell to a further treatment means.

4. The apparatus of claim 3 wherein said pickup unit includes a plate-like chamber having a generally flat bottom wall including a plurality of distributed openings and a top and side walls, said means to form said vacuum being coupled to said chamber, a piercing means located between said openings and forced into the top crust of said partially baked shell, and means to supply a positive pressure to said chamber to release said shell with said perforated top crust.

5. The apparatus of claim 4 wherein said plate-like chamber is supported by a reciprocating positioner, means to raise and lower said chamber by corresponding actuation of said positioner, and control means to sequentially retract said chamber and lower said chamber with the plate resting on said shell and to establish said vacuum and then raise said chamber and thereafter extend said chamber, said control means removing said vacuum and creating said positive pressure in response to extension of said chamber.

6. The food dough forming apparatus of claim 3 wherein said pair of die members includes a flat bed and an inverted cup-shaped shallow die unit forming said cavity, said heating means including a heater connected to said bed and a heater connected to said die to heat and bake the dough from top and bottom within the cavity.

7. The food dough apparatus of claim 3 including a reciprocating transfer means resting on the supporting surface for pushing of a dough patty between said die members.

8. The food dough forming apparatus of claim 3 wherein said pickup means is movable into overlying covering relationship to said shell between said die members.

9. The food dough forming apparatus of claim 3 having a transfer position means to place dough between the die members and including a control means coupled to actuate said transfer positioning means, said die positioning means and said pickup means and having response means responsive to the actuation of each of said positioning means to control the cyclical actuation of said positioning means.

10. The food dough forming apparatus of claim 9 wherein said several positioning means are pneumatic piston-cylinder units having piston rod elements and said response means includes limit switches responsive to the extension and retraction of said piston rod elements.

11. The food dough forming apparatus of claim 3 including a vacuum operated pickup chamber having a perforated bottom wall, said bottom wall having a plurality of piercing means for piercing at least the top surface of said shell.

* * * * *

UNITED STATES PATENT AND TRADEMARK OFFICE
CERTIFICATE OF CORRECTION

PATENT NO. : 3,949,660
DATED : April 13, 1976
INVENTOR(S) : HARVEY G. KUHLMAN

It is certified that error appears in the above-identified patent and that said Letters Patent are hereby corrected as shown below:

| | | | |
|---|---|---|---|
| ABSTRACT | Line | 16, | after "plate" cancel "is" and insert --- in ---; |
| Column | 2, Line | 4, | after "members" cancel "esstentially" and insert --- essentially ---; |
| Column | 2, Line | 6, | after "fluid" cancel "cyclinder" and insert --- cylinder ---; |
| Column | 3, Line | 3, | cancel "piston-cyclinder" and insert --- piston-cylinder ---; |
| Column | 3, Line | 5, | cancel "piston-cyclinder" and insert --- piston-cylinder ---; |
| Column | 3, Line | 10, | before "unit" cancel "cyclinder" and insert --- cylinder ---; |
| Column | 3, Line | 12, | before "units" cancel "cyclinder" and insert --- cylinder ---; |
| Column | 4, Line | 26, | before "unit" cancel "cyclinder" and insert --- cylinder ---; |
| Column | 9, Line | 48, | before "power" cancel "supplied" and insert --- supply ---; |
| Column | 9, Line | 58, | before "L-4" cancel "aligned" and insert --- line ---; |

UNITED STATES PATENT AND TRADEMARK OFFICE
CERTIFICATE OF CORRECTION

PATENT NO. : 3,949,660
DATED : April 13, 1976
INVENTOR(S) : HARVEY G. KUHLMAN

It is certified that error appears in the above-identified patent and that said Letters Patent are hereby corrected as shown below:

Column 10, Line 28, at the beginning of the line, cancel "queential" and insert --- quential ---;

Column 11, Line 19, after "contacts" cancel "110" and insert --- 110a ---;

Column 12, CLAIM 2, Line 32, before "units" cancel "piston-cyclinder" and insert --- piston-cylinder ---;

Column 12, CLAIM 3, Line 39, after "having" cancel "said";

Column 13, CLAIM 6, Line 9, before "heating" cancel "said" and insert --- and ---;

Signed and Sealed this

Fifth Day of October 1976

[SEAL]

Attest:

RUTH C. MASON
Attesting Officer

C. MARSHALL DANN
Commissioner of Patents and Trademarks